Sept. 25, 1962 FRIEDRICH-KARL KROOS 3,056,044

BINARY COUNTER AND SHIFT REGISTER CIRCUIT EMPLOYING DIFFERENT RC TIME CONSTANT INPUT CIRCUITS

Filed Sept. 2, 1958

BISTABLE FLIP FLOP STAGE WITHIN COUNTER STAGE St.

Inventor:
Friedrich-Karl Kroos.
By [signature] Atty.

United States Patent Office 3,056,044

Patented Sept. 25, 1962

3,056,044

BINARY COUNTER AND SHIFT REGISTER CIRCUIT EMPLOYING DIFFERENT RC TIME CONSTANT INPUT CIRCUITS

Friedrich-Karl Kroos, Munich, Germany, assignor to Siemens & Halske Aktiengesellschaft, Berlin and Munich, a corporation of Germany Filed Sept. 2, 1958, Ser. No. 758,473
Claims priority, application Germany Sept. 26, 1957
2 Claims. (Cl. 307—88.5)

This invention is concerned with a binary counter built up of bistable flip stages.

In known counters of the above noted kind, the flip stages are coupled so as to produce a purely binary counting, that is, each bistable flip stage included in a chain circuit is stepped ahead only with half of the impulse sequence frequency of the preceding flip stage. Such counters are being used for diverse purposes in the communication art and, for example, also in various calculating or computing machines.

Other devices employed in communication systems, especially data processing systems, include the so-called shift registers. Such shift registers are also constructed of bistable flip stages, the appearance of a shift impulse impressing a predetermined position of a bistable flip stage upon a neighboring flip stage disposed in the shift direction. Shift registers of this kind are also being used, among others, for speed translation, for instance, in feeding information to serial calculators in which a certain binary number is initially fed (supply timing) with a relatively low impulse frequency, being as required checked out by the core of the machine at a shift frequency adapted to the operating frequency of the calculator.

The binary counter built up of flip stages is in accordance with the invention constructed so that it may also be used for shifting of the binary numbers stored therein. Therefore, in accordance with the invention, a chain of bistable switching members is selectively employed as a counter or as a shift register. The counting circuit serves in particular to deliver a binary counting result in series representation, which had not been possible in the case of previously known counters. The binary counter according to the invention therefore makes it for the first time possible to feed to the calculator a predetermined value simply by supplying thereto a number of impulses corresponding to the number to be processed, the counting result being "shot" into the machine. The binary counter according to the invention makes it moreover possible to effect multiplication of the counting result with two powers, simply by shifting the counting result by one, two or more stages. Division of a counting result may accordingly be effected merely by interchanging the shift direction.

Figure 1:
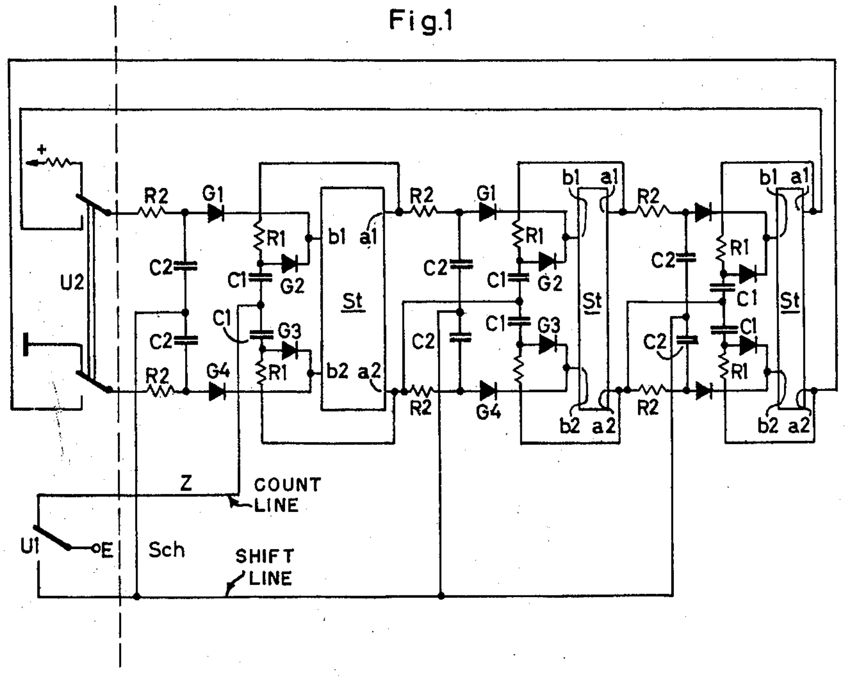
Figure 2:
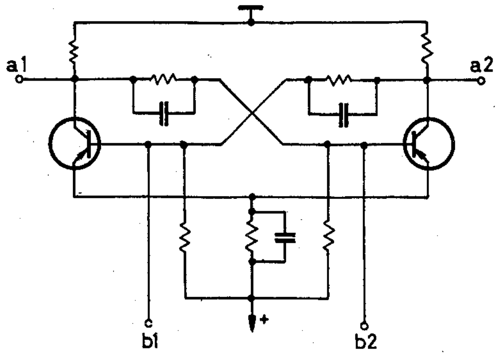

The foregoing and other objects and features of a binary counter according to the invention, and particularly, and advantageous circuit for the arrangement and uncoupling of the input lines for the impulse counting and for the shift timing, will appear from the description of the circuit example which is rendered below with reference to the accompanying drawing, wherein FIG. 1 shows the circuit for a three-stage binary counter; and FIG. 2 shows the circuit for a bistable flip stage within the counter according to FIG. 1.

The binary counter according to the invention comprises three bistable flip stages *St*. Each flip stage has two input lines *b1*, *b2* and two input lines *a1*, *a2*. Feed impulses supplied to the terminal E are either conducted to the first flip stage by way of the impulse counting line Z or to all flip stages in parallel, as shift pulses or signals, by way of the shift line *Sch*. The individual lines are mutually uncoupled by means of diode rectifiers G1 to G4. The counting signal impulses are conducted to the respective bistable stages by way of capacitors C1, the respective counting signal pulse being derived either directly from the counting line Z or from a preceding flip stage the rectifier of which is correspondingly prepared by the feedback path extending by way of its resistor A1. A counting pulse can accordingly be conducted to the input *b1* of the first flip stage only when the rectifier G2 is not blocked by a potential derived from the output *a1* which is conducted to such rectifier by way of resistor R1, such blocking preventing passage of the corresponding impulse. Counting circuits of this general character, comprising a feedback from the output to the input are broadly known.

The shift impulses are however conducted to all bistable flip stages in parallel, in each case to the center tap between the respective capacitors C1. A defined position of a flip stage always has a defined bias of one of its output lines and therewith of one of the rectifiers G1 or G4, so that a shift signal impulse that may appear can reach only the input of one flip stage, such impulse triggering or operatively releasing the corresponding flip stage, causing such stage to assume the position or condition in which the preceding stage had been prior to appearance of the shift signal.

In the use of the circuit as shift register, the potential at the output terminal *a2* may change and, accordingly, changing potential would additionally trigger the respectively succeeding stage by way of the corresponding counting input C1, G2 and G3. The invention avoids such erroneous triggering by making the time constant R2—C2 of the shift input greater, for example, by the factor 8, than the time constant R1—C1 of the counting input. The operative effect of the shift impulse therefore overlies the effect of erroneous triggering that may during the shifting appear at a counting input The overlying effect of the shift impulse is increased by the fact that the erroneous triggering, due to finite timing in a flip stage, becomes in the succeeding stage always later operative than the directly supplied shift impulse.

As shown in the drawing, the circuit is provided with a switch U1 for selectively extending impulses for counting from the input terminal E to the line Z or as shift impulses to the line *Sch*.

Another switch U2 is provided for interrupting, in the illustrated position thereof, the feedback line R extending from the last flip stage and at the same time placing on the first flip stage a potential which is responsive to appearance of a shift pulse always operative to cause such flip stage to effect storage of "0." In its alternate position, the switch U2 closes the feedback circuit. With such circuit closed and responsive to appearance of a shift impulse, the information stored in the flip stage chain will be caused to circulate repeatedly through the chain until such a time when it is checked out or utilized.

FIG. 2 shows an example of a bistable flip stage having input terminals *b1*, *b2* and output terminals *a1*, *a2* marked similarly as in FIG. 1. The example shows a transistor flip stage which is controlled or triggered by positive impulses and in which the output voltages are obtained at the collector.

It is understood, of course, that the invention is not limited to binary counters comprising flip stages built up by the use of transistors. It is likewise understood that counters comprising tubes, including, for example, tubes of the cold cathode type, may be supplemented to operate as shift registers according to the invention. There will be obtained the advantage in each case that a given counting result may be in simple manner checked out in series representation without requiring a series converter.

Changes may be made within the scope and spirit of the appended claims.

I claim:

1. A counter and shift register comprising a plurality of serially related stages, each stage having two transistors and circuit means for interconnecting said transistors to form a bistable flip circuit, whereby the collector of one transistor is connected with the base of the other transistor, each stage having means for receiving count impulses from a preceding stage, and means for supplying shift pulses to all stages, each of said named means having a time constant, the time constant of the means for supplying the shift pulses being greater than the time constant of the means for receiving count pulses.

2. A counter and shift register according to claim 1, wherein the means for supplying the shift pulses and the means for receiving the count pulses, are respectively formed by diode means and RC-components, the time constant of the respective RC-components for the supply of the shift pulses being greater than the time constant of the RC-components for the reception of count pulses.

References Cited in the file of this patent

UNITED STATES PATENTS

| | | |
|---|---|---|
| 2,782,305 | Havens | Feb. 19, 1957 |
| 2,802,104 | White | Aug. 6, 1957 |
| 2,808,203 | Geyer et al. | Oct. 1, 1957 |
| 2,819,840 | Huntley et al. | Jan. 14, 1958 |
| 2,900,500 | Edwards | Aug. 18, 1959 |